(12) United States Patent
Ishiguro et al.

(10) Patent No.: US 7,039,406 B2
(45) Date of Patent: May 2, 2006

(54) RADIO COMMUNICATION METHOD, RADIO BASE STATION AND RADIO TERMINAL

(75) Inventors: Takayuki Ishiguro, Yokosuka (JP); Hiroyuki Ishii, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 201 days.

(21) Appl. No.: 10/643,966

(22) Filed: Aug. 20, 2003

(65) Prior Publication Data

US 2004/0038680 A1 Feb. 26, 2004

(30) Foreign Application Priority Data

Aug. 21, 2002 (JP) ............................. 2002-241100

(51) Int. Cl.
*H04Q 7/20* (2006.01)
(52) U.S. Cl. .................. 455/436; 455/437; 455/438; 455/439; 370/331
(58) Field of Classification Search ................ 455/436, 455/437, 438, 439, 440, 442, 443, 524, 422.1; 370/329, 331, 332, 333, 235
See application file for complete search history.

(56) References Cited

U.S. PATENT DOCUMENTS

| | | | | |
|---|---|---|---|---|
| 6,141,388 | A * | 10/2000 | Servais et al. | 375/262 |
| 6,349,208 | B1 | 2/2002 | Sexton et al. | |
| 2002/0045449 | A1* | 4/2002 | Oobayashi | 455/436 |
| 2002/0080719 | A1* | 6/2002 | Parkvall et al. | 370/235 |
| 2002/0136192 | A1* | 9/2002 | Holma et al. | 370/347 |
| 2002/0150094 | A1* | 10/2002 | Cheng et al. | 370/389 |
| 2002/0193135 | A1* | 12/2002 | Nakano | 455/524 |
| 2003/0063583 | A1* | 4/2003 | Padovani et al. | 370/329 |
| 2003/0131299 | A1* | 7/2003 | Ahn et al. | 714/748 |
| 2003/0152031 | A1* | 8/2003 | Toskala et al. | 370/236 |
| 2003/0224774 | A1* | 12/2003 | Cheng et al. | 455/422.1 |
| 2004/0081248 | A1* | 4/2004 | Parolari | 375/259 |
| 2004/0146033 | A1* | 7/2004 | Soderstrom et al. | 370/338 |
| 2005/0039101 | A1* | 2/2005 | Torsner | 714/748 |

FOREIGN PATENT DOCUMENTS

| | | |
|---|---|---|
| CN | 1348669 A | 5/2002 |
| EP | 1 024 676 | 8/2000 |
| JP | 2000-92542 | 3/2000 |
| JP | 2000-24194 | 8/2000 |
| WO | WO 00/32001 | 6/2000 |
| WO | WO 01/76162 | 10/2001 |

* cited by examiner

*Primary Examiner*—Joseph Feild
*Assistant Examiner*—Huy D. Nguyen
(74) *Attorney, Agent, or Firm*—Oblon, Spivak, McClelland, Maier & Neustadt, P.C.

(57) ABSTRACT

In radio communication, the throughput reduction of a whole radio communication system caused by discarding retransmission data at the time of handover is prevented. The system includes a radio terminal for conducting data transmission and reception with a radio base station by executing one or more processes, a process executer in the radio base station for executing processes depending upon a number of processes executed in the radio terminal, and transmitting/receiving data to/from the radio terminal, a handover monitor in the radio base station for monitoring for the occurrence of handover or for the possibility of occurrence of handover in the radio terminal, and a process number controller in the radio base station for controlling the number of processes executed by the process executer according to a result of monitoring conducted by the handover monitor.

9 Claims, 7 Drawing Sheets

FIG.4

| SIGNAL-TO-INTERFERENCE RATIO (SIR) | THRESHOLD (NUMBER OF EFFECTIVE PROCESSES) |
|---|---|
| $SIR < 0\ dB$ | 1 |
| $0\ dB < SIR \leq 1\ dB$ | 2 |
| $1\ dB < SIR \leq 2\ dB$ | 3 |
| $2\ dB < SIR \leq 3\ dB$ | 4 |
| $3\ dB < SIR \leq 4\ dB$ | 5 |
| $4\ dB < SIR \leq 5\ dB$ | 6 |
| $5\ dB < SIR$ | 7 |

RADIO COMMUNICATION METHOD, RADIO BASE STATION AND RADIO TERMINAL

CROSS REFERENCE TO RELATED APPLICATIONS

This application is based upon and claims the benefit or priority from the prior Japanese Patent Applications No.2002-241100, filed on Aug. 21, 2002; the entire contents of which are incorporated herein by reference.

BACKGROUND OF THE INVENTION

1. Field of the Invention

The present invention relates to a radio communication method, a radio base station and a radio terminal used in radio communication according to IMT-2000 HSDPA or the like.

2. Description of the Related Art

Conventionally, in HSDPA (High Speed Downlink Packet Access) using IMT-2000, IMT-2000CDMA Direct Spread and IMT-2000 CDMA TDD (hereafter referred to as IMT-2000), the HARQ (Hybrid Automatic Repeat Request) system using Stop and Wait, which is simple in configuration, is used as the errored data retransmission scheme.

In this HARQ system, a down data signal is transmitted from a radio base station to a radio terminal. If the radio terminal receives the down data signal correctly, then the radio terminal transmits ACK (Acknowledgement) information to the radio base station by using an up control signal. If the radio terminal receives the down data signal erroneously, then the radio terminal transmits NACK (Not Acknowledgement) information to the radio base station by using an up control signal.

If the radio base station receives the up control signal and judges that the ACK has been received, then the radio base station transmits the next down data signal to the radio terminal. If the radio base station judges that the NACK has been received, then the radio base station retransmits the down data signal.

In the conventional HARQ system, each of the radio terminal and the radio base station has a plurality of processes 1 to N for the HARQ. Respective processes 1 to N conduct HARQ processing independently. According to this processing, lowering of throughput caused by the Stop and Wait can be reduced by preparing a plurality of processes.

It is now supposed that there is an error in a down data signal received by the radio terminal and handover occurs before retransmitted data from the radio base station is received as a result of the conventional HARQ processing. If switching to communication with another radio base station is thus conducted, then a down data signal to be retransmitted from the handover source is discarded. Therefore, the erroneous down data signal received in the beginning and stored in the radio terminal cannot be decoded either, and the erroneous down data signal is discarded. As the HARQ processes for performing communication between the radio terminal and the radio base station increase, the number of the discarded down data signals also tends to increase.

If the number of discarded down data signals increases, then throughput to other radio terminals that conduct communication with the same radio base station decreases. This results in a problem of throughput being degraded by retransmission of the discarded down data signal using an upper layer, such as the TCP/IP, in the radio terminal and the radio base station.

BRIEF SUMMARY OF THE INVENTION

Therefore, the present invention has been achieved in order to solve the problem. An object of the present invention is to provide a radio communication system, a radio communication method, a radio base station and a radio terminal capable of preventing the throughput lowering of the whole system caused by discarding retransmission data at the time of handover, by limiting the number of retransmission processes and reducing the retransmission data if there is a possibility of handover in radio communication according to IMT-2000 HSDPA or the like.

In accordance with the present invention, the object is achieved by a radio communication method of conducting data transmission and reception between a radio base station and a radio terminal by executing one or more processes. The radio communication method includes the steps of executing in the radio base station processes depending upon a number of processes executed in the radio terminal, and transmitting/receiving data to/from the radio terminal, monitoring for the occurrence of handover or a possibility of occurrence of handover in the radio terminal, and controlling the number of processes executed at the executing step according to a result of monitoring conducted at the monitoring step.

According to the present invention, the number of processes that are being executed between the radio base station and the radio terminal can be reduced, when handover has occurred or when there is a possibility of occurrence of handover, and the occurrence of retransmission process caused by a data error or the like can be reduced. According to the present invention, therefore, the probability of discard of retransmission data caused at the time of handover can be reduced. As a result, the throughput lowering in the whole system can be prevented.

In the invention, it is desirable to detect the occurrence of handover on the basis of handover requesting information, the quality of radio communication, the error rate in radio communication, and the distance between the radio base station and the radio terminal.

In this case, the occurrence of handover can be detected in early stages. In addition, the decrease quantity in the number of processes can be adjusted according to the possibility of the occurrence of handover. The throughput lowering can be prevented effectively while balancing the communication situation with the handover occurrence probability.

In the invention, it is desirable to provide a threshold table in which an index value indicating the occurrence of handover or a possibility of its occurrence is associated with a threshold in the number of processes that can be executed, collate a result of monitoring conducted by the handover monitor with the threshold table, and control the number of processes that can be executed, on the basis of a result of the collation. In this case, the index value can be previously associated with the number of processes by using the threshold table, and it becomes possible to rapidly adjust the number of processes in response to the occurrence of handover.

In the invention, it is desirable that if a process that is conducting data retransmission is detected, data transmission and reception are conducted by preferentially using the process that is conducting the retransmission. In this case, the state of the process that is being executed at the time of the occurrence of handover or at the time when a possibility of occurrence of handover has occurred is held, and only processes that are not being used can be made the subject of decrease. It is thus possible to avoid a harmful effect caused by reducing the number of processes, such as stopping a process that is transmitting retransmission data.

In accordance with the present invention, the object is achieved by a radio base station for conducting data transmission and reception with a radio terminal, the radio base station comprising a process executer for executing processes depending upon a number of processes executed in the radio terminal, and transmitting/receiving data to/from the radio terminal, a handover monitor for monitoring for the occurrence of handover or for a possibility of occurrence of handover in the radio terminal, and a process number controller for controlling the number of processes executed by the process executer according to a result of monitoring conducted by the handover monitor.

In the above radio base station, it is desirable that the handover monitor detects the occurrence of handover by acquiring handover requesting information.

In the above radio base station, it is desirable that the handover monitor detects a possibility of occurrence of handover on the basis of a quality of radio communication between the radio base station and the radio terminal.

In accordance with the present invention, the object is achieved by a radio terminal for conducting data transmission and reception with a radio base station by executing one or more processes, the radio terminal comprising a handover monitor for monitoring for the occurrence of handover or for a possibility of occurrence of handover in the radio terminal, a handover requester for transmitting handover requesting information to the radio base station according to a result of the monitoring conducted by the handover monitor, and a process executer for conducting data transmission and reception by using the number of processes that can be executed and determined by the radio base station.

In the above radio terminal, it is desirable that the handover monitor detects a possibility of occurrence of handover on the basis of a quality of radio communication between the radio base station and the radio terminal.

BRIEF DESCRIPTION OF THE SEVERAL VIEWS OF THE DRAWINGS

FIG. 4 is a diagram showing a threshold table according to an embodiment;

DETAILED DESCRIPTION OF THE INVENTION

A first embodiment of a radio communication system according to the present invention will now be described with reference to the drawings.

(Configuration of Radio Communication System)

Figure 1:
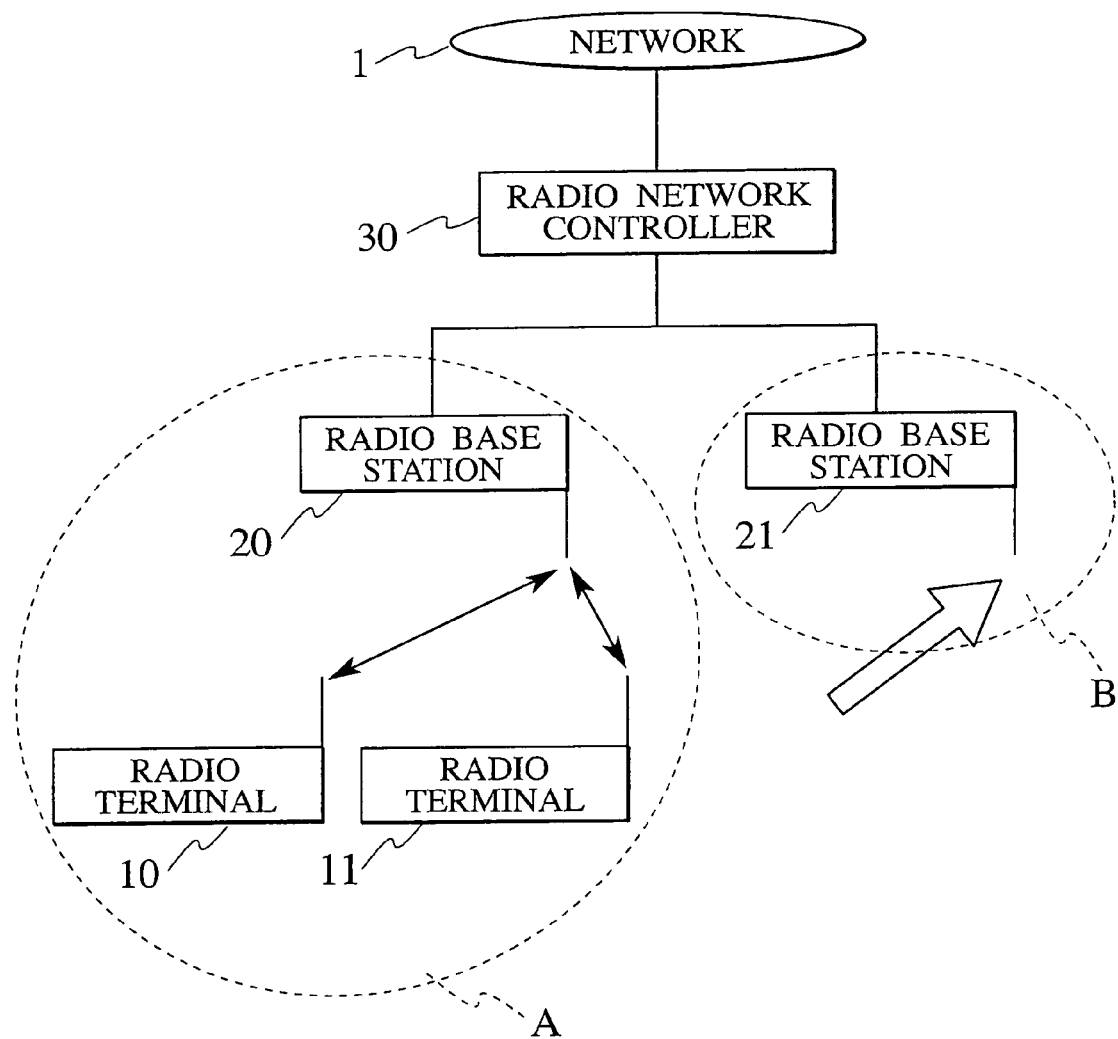
FIG. 1 is a concept diagram showing a general configuration of a radio communication system according to an embodiment of the present invention.

FIG. 1 is a concept diagram showing a general configuration of a radio communication system according to an embodiment of the present invention.

As shown in FIG. 1, a radio communication system according to the present embodiment includes radio terminals 10 and 11, radio base stations 20 and 21 installed in respective areas, a radio network controller 30 for controlling the radio base stations 20 and 21, and a network 1 to which the radio network controller 30 is connected.

In the present embodiment, communication between the radio terminals 10, 11 and the radio base station 20 is conducted by using the IMT-2000 HSDPA system. In the communication between the radio terminals 10, 11 and the radio base station 20, the radio base station 20 conducts transmission to and reception from the radio terminals 10 and 11 by using an HS-PDSCH (High Speed Physical Downlink Shared Channel), which is a common channel of the radio terminal 10 and the radio terminal 11, according to radio quality between the radio terminals 10, 11 and the radio base station 20, and the amount of data and priority of data transmitted to the radio terminals 10 and 11 by the radio base station 20. As for communication from the radio terminals 10 and 11 to the radio base station 20, data signals are transmitted respectively by using DPCHs (Dedicated Physical Channels), which are individual channels.

In the case where the radio terminals 10, 11 and the radio base station 20 conduct communication in the present embodiment, the radio base station 20 and the radio terminal 10 execute a plurality of processes for HARQ processing, and the radio base station 20 and the radio terminal 11 execute a plurality of processes for HARQ processing. The maximum number of processes between the radio base station 20 and the radio terminal 10 is determined on the basis of the memory quantity included in the radio base station 20 and the radio terminal 10. Incidentally, the maximum number of processes for the radio terminal 10 may differ from the maximum number of processes for the radio terminal 11.

It is supposed that the maximum number of processes conducted from the radio base station 20 to the radio terminal 10 is $P_{MAX}$ and processes for transmission from the radio base station 20 to the radio terminal 10 are referred to as process 1 to process $P_{MAX}$.

Figure 2:
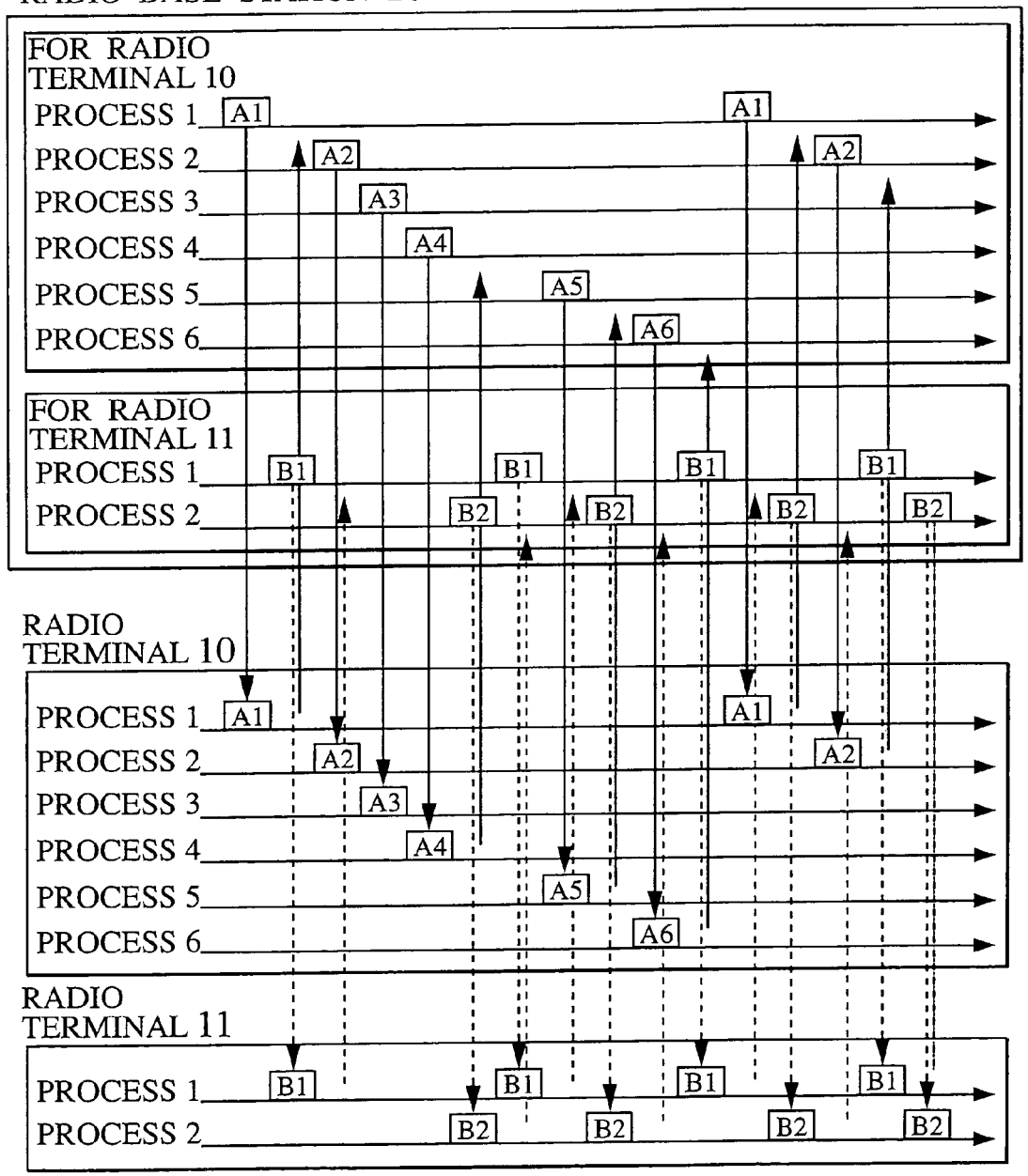
FIG. 2 is a diagram showing processes executed in a radio communication system according to an embodiment of the present invention.

Specifically, it is supposed that the radio base station 20 can activate a maximum of six processes A1 to A6 for the radio terminal 10 and a maximum of two processes B1 and B2 for the radio terminal 11 as shown in FIG. 2. Incidentally, respective processes conducts HARQ processing independently.

The radio base station 20 determines radio terminals to which transmission is conducted at a predetermined time interval unit, on the basis of radio quality between the radio terminals 10, 11 and the radio base station 20, and traffic volume to be transmitted to the radio terminals 10 and 11. At this time, transmission only to the radio terminal 10, only to the radio terminal 11, and to both the radio terminals 10 and 11 can be conducted by using code multiplexing or time multiplexing.

The radio base station 20 switches processes for every radio terminal and conducts transmission. For the radio terminal 10, processes are switched as represented by process A1→process A2→ . . . process A6→process A1→ . . . . For the radio terminal 11, processes are switched as represented by process B1→process B2→process B1→ . . . . In the present embodiment, it is supposed that the priorities of down data signals transmitted in respective processes are the same.

Each of the radio terminals 10 and 11 conducts reception in a process corresponding to the process in the radio base station 20. If the received down data signal is correct, then the radio terminal transmits ACK after a predetermined period. If the received down data signal is erroneous, then the radio terminal transmits NACK.

Upon receiving the up control signal and judging that ACK has been received, the radio base station 20 transmits the next down data signal to the radio terminal 10. Upon judging that NACK has been received, the radio base station 20 retransmits the down data signal.

The radio base station 20 can transmit a signal that is different from the down data signal transmitted first, as the retransmitted down data signal. For example, in the case where the radio base station 20 transmits a Turbo encoded down data signal, it is also possible to transmit original data bits and partial redundancy bits in the first transmission and transmit a data signal including different redundancy bits at the time of retransmission. As a result, the radio terminal 10 can decode a signal efficiently by coupling the signal received first and the signal received in retransmission and performing Turbo-decoding.

The radio network controller 30 conducts call processing for the radio terminal 10, a decision regarding the handover for the radio terminal 10, and data relay processing for the network 1 and the radio base stations 20, 21.

(Configuration of Radio Base Station)

Figure 3:
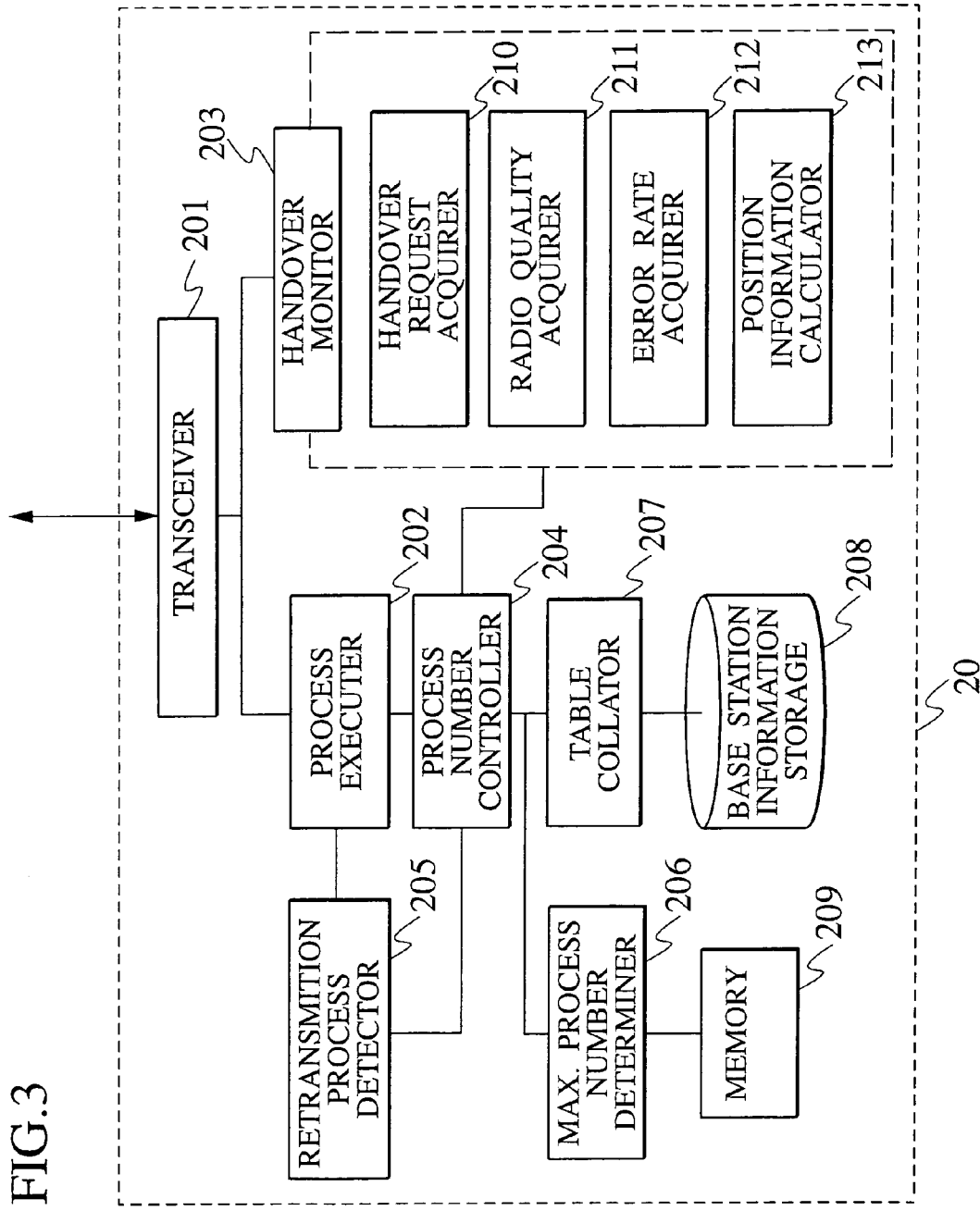
FIG. 3 is a block diagram showing an internal configuration of a radio base station according to an embodiment.

An internal configuration of the radio base station 20 will now be described in detail. FIG. 3 is a block diagram showing an internal configuration of a radio base station according to the present embodiment.

As shown in FIG. 3, the radio base station 20 includes a process executer 202 and a transceiver 201 for executing processes depending upon the number of processes executed in the radio terminals 10, 11 and transmitting/receiving data to/from the radio terminals 10, 11, a handover monitor 203 for monitoring for the occurrence of handover or a possibility of occurrence of handover in the radio terminals 10, 11, and a process number controller 204 for controlling the number of processes executed by the process executer 202 according to a result of monitoring conducted by the handover monitor 203.

The handover monitor 203 includes a handover request acquirer 210 for acquiring handover requesting information and thereby detecting handover occurrence, a radio quality acquirer 211 for detecting the possibility of occurrence of handover on the basis of the quality of radio communication for the radio terminals 10 and 11, an error rate acquirer 212 for detecting the possibility of occurrence of handover on the basis of the error rate of radio communication for the radio terminals 10 and 11, and a position information calculator 213 for detecting the possibility of occurrence of handover on the basis of the distance between the radio base station 20 and the radio terminals 10, 11.

The handover request acquirer 210, the radio quality acquirer 211, the error rate acquirer 212 and the position information calculator 213 may detect handover independently or may detect handover in cooperation. In the present embodiment, it is supposed that the units 211 to 213 detect handover in cooperation.

For example, on the basis of the position information of the radio terminals 10 and 11 located in the same area (such as distances from the radio base station), radio qualities and error rates of the radio terminals 10 and 11 are predicted and compared. If radio quality or error rate of the radio terminal 10 or 11 deviates from a result of the prediction, then the possibility of occurrence of handover is judged to be high.

In the present embodiment, the process number controller 204 is connected to the process executer 202, and is connected to a base station information storage 208 via a table collator 207. The base station information storage 208 is a database for storing a threshold table, in which the occurrence of handover or an index value (such as radio quality, error rate, or distance) indicating the possibility of occurrence of handover is associated with a threshold for the number of processes that can be executed (the number of effective processes).

As the threshold table according to the present embodiment, for example, a threshold table in which the signal-to-interference ratio (SIR) is associated with the threshold (TH) as shown in FIG. 4 can be used. If radio quality between the radio terminal 10 and the radio base station 20 is poor (the value of the SIR is 0 dB or less), then the threshold TH approaches unity in the example shown in FIG. 4. As radio quality between the radio terminal 10 and the radio base station 20 becomes more favorable, the threshold TH approaches $P_{MAX}+1$. As radio quality, at least one of the signal-to-interference ratio SIR of the up data signal or the up control signal (hereafter referred to as up signal) and the signal-to-interference ratio SIR of the down data signal or the down control signal (hereafter referred to as down signal) can be used. Incidentally, the SIR of the down signal can be transmitted from the radio terminal 10 to the radio base station 20 by using the up signal.

The value in the threshold table is previously determined so as to reduce discarded down data at handover while minimizing the throughput degradation every radio base station. The threshold table may be a different table according to the number of simultaneously connected radio terminals.

The process number controller 204 is connected to the handover monitor 203. The table collator 207 collates a result of monitoring conducted by the handover monitor 203 with the threshold table. According to a result of the collation, the process number controller 204 controls the number of processes that can be executed.

In addition, a maximum process number determiner 206 is connected to the process number controller 204. The maximum process number determiner 206 is also connected to a memory 209. The maximum process number determiner 206 determines a maximum number of processes that can be used, according to capability of the memory 209, and sends a result of the determination to the process number controller 204.

In the present embodiment, a retransmission process detector 205 is connected to the process executer 202 for detecting a process that is conducting data retransmission. If the process that is conducting data retransmission has been detected by the retransmission process detector 205, then the process executer 202 conducts data transmission and reception by preferentially using the process that is conducting data retransmission.

(Radio Communication Method Using Radio Communication System)

Figure 5:
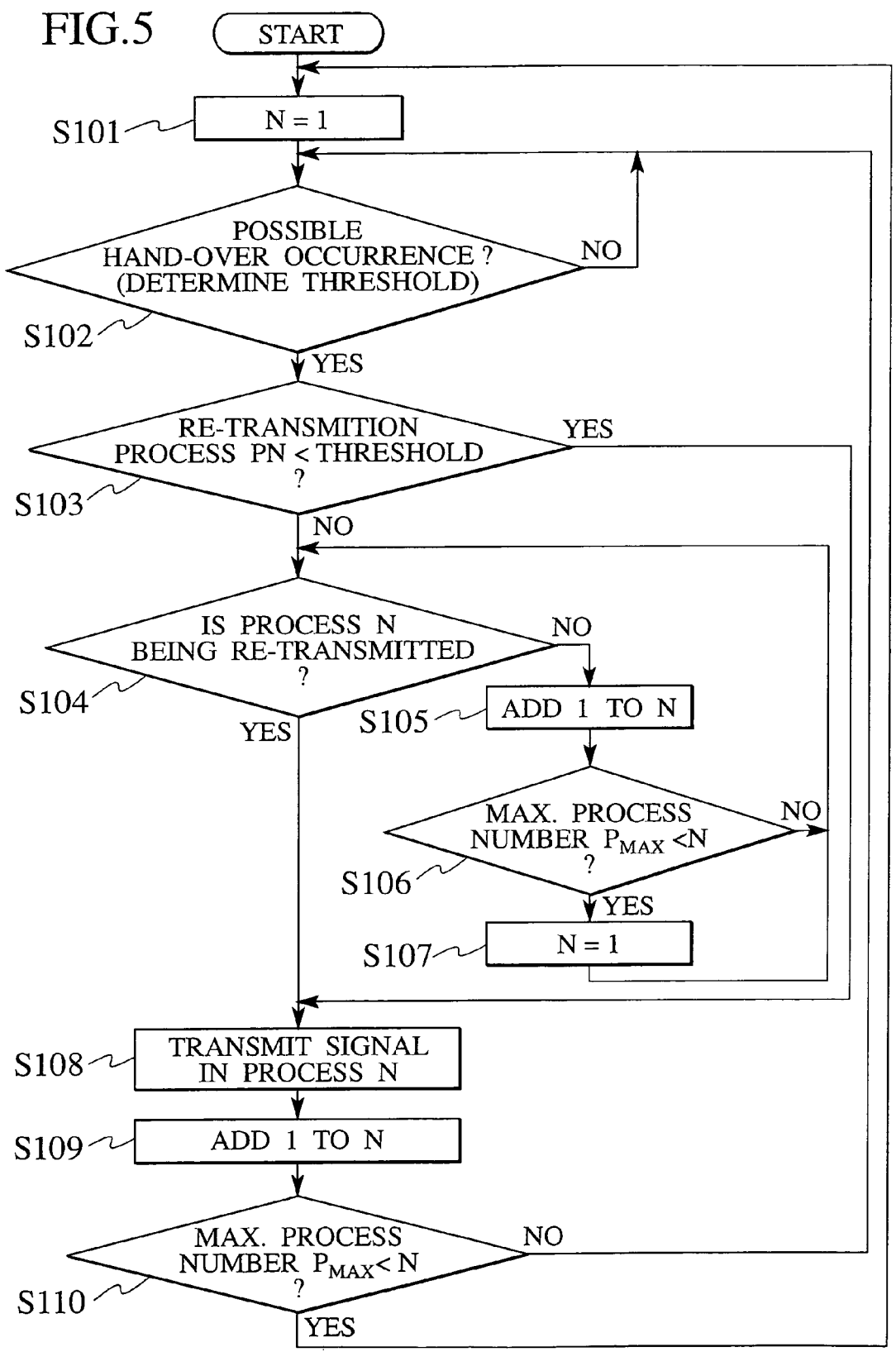
FIG. 5 is a flow chart showing a radio communication method using a radio communication system according to an embodiment.

A radio communication method using the radio communication system according to the present embodiment will now be described with reference to a flowchart shown in FIG. 5. FIG. 5 exemplifies the case where the radio base station 20 transmits a down data signal to the radio terminal 10. It is now supposed that the radio base station 20 has already transmitted a down data signal to the radio terminal 10 and the radio base station 20 is conducting retransmission processing in a process 2. In addition, it is supposed that the maximum number $P_{MAX}$ of processes for the radio terminal 10 is 6.

(1) Handover Monitoring Based on Radio Quality

First, the case where handover is monitored on the basis of radio quality will be described.

In order to detect the communication situation of each process for the radio terminal 10, the radio base station changes the process N successively from 1 to the maximum process number $P_{MAX}(=6)$ and ascertains the communication situation for each process N.

Specifically, in step S101, the radio base station 20 conducts initialization by substituting 1 for N, and starts the ascertainment from the process 1. Subsequently, in step S102, the radio base station 20 determines whether handover is occurring in communication with the radio terminal 10 or if this is possible. The decision as to whether handover is occurring is conducted on a basis of the degradation of radio quality in the communication to the radio terminal 10.

If it is judged that there is a possibility of handover, then the threshold TH is determined in the step S102 and the processing proceeds to step S103. Otherwise, the processing proceeds to the step S101, and the current state is maintained by the loop processing. It is now supposed that the radio quality acquirer 211 has ascertained a degradation of radio quality and judged that there is a possibility of occurrence of handover.

The threshold TH is a number in 1, 2, . . . , $P_{MAX}+1$. In the present embodiment, the threshold TH is determined on the basis of radio quality (signal-to-interference ratio SIR) between the radio terminal 10 and the radio base station 20. It is now supposed that radio quality between the radio terminal 10 and the radio base station 20 is poor (SIR<0 dB) and the threshold TH is set equal to 1.

Subsequently, in the step S103, the radio base station 20 calculates the number PN of processes that are conducting retransmission because of an error in the down data signal to the radio terminal 10, in the processes for transmitting down data signals to the radio terminal 10. If the calculated number PN of processes is smaller than the threshold TH, then the processing proceeds to step S108. Otherwise, the processing proceeds to step S104. As for the number PN of processes that conduct retransmission, the process 2 conducts retransmission processing, and consequently it follows that PN=1. Since TH=1, the processing proceeds to the step S104.

In the step S104, the radio base station 20 determines whether the process N is conducting retransmission processing. If the process N is conducting retransmission processing, then the processing proceeds to the step S108. Otherwise, the processing proceeds to step S105. Since the current process N, i.e., the process 1 is not conducting the retransmission processing, the processing proceeds to the step S105.

In the step S105, the radio base station 20 adds 1 to N, and proceeds to the next process monitoring. At this time, in step S106, the radio base station 20 compares N with $P_{MAX}$. If $N>P_{MAX}$, then the radio base station 20 does not monitor the next process, substitutes 1 for N and performs initialization in step S107, and proceeds to the step S104 to conduct the processing of the step S104 and subsequent steps again. If the next process does not reach $P_{MAX}$ in the step S106, then the processing of the step S104 and subsequent steps is conducted for a subsequent process obtained by addition in the step S105. Here, since N=1 and $P_{MAX}=6$ have been set in this embodiment, N=2 is obtained in step S105 and it is compared with $P_{MAX}$ in the step S106. As a result, since N(=2) is still smaller than $P_{MAX}$, the processing proceeds to the step S104.

Since the process 2 is conducting the retransmission processing in the step S104, the processing proceeds to the step S108. In the step S108, the radio base station 20 conducts the retransmission of the down data signal to the radio terminal 10 by using the process 2. In step S109, the radio base station 20 compares N with $P_{MAX}$. Instep S110, if $N>P_{MAX}$, the processing proceeds to the step S101. Otherwise, the processing proceeds to the step S102.

The radio terminal 10 receives the down data signal by using the process 2, and conducts decoding using HARQ. If there are no errors, the radio terminal 10 transmits ACK information indicating that there are no errors to the radio base station 20 after a predetermined period. If there is an error, the radio terminal 10 transmits NACK information indicating that there is an error to the radio base station 20 after a predetermined period. Upon receiving the ACK information, the radio base station 20 stops the corresponding retransmission processing using the process 2 and transmits a new down data signal.

(2) Handover Monitoring Based on Position Information

The handover monitoring method in the step S102 may be conducted on the basis of the positions of the radio base station 20 and the radio terminal 10. Specifically, the position information calculator 213 measures a distance R between the radio base station 20 and the radio terminal 10, and a possibility of occurrence of handover is judged on the basis of a result of the measurement. If it is judged that there is a possibility of handover, then the threshold TH is determined on the basis of the distance R according to a threshold table storing relations between the distance R and the threshold TH. For example, if the distance R is at least a predetermined threshold R1 then it is judged that handover processing is possible and the threshold TH is decreased. If the distance R is at least a predetermined threshold R2, then the threshold TH is increased.

In an alternative method for measuring the distance R, the radio terminal 10 includes a GPS device, and transmits position information calculated using the GPS device to the radio base station 20, and the radio base station 20 calculates the distance R. In the case where IMT-2000 CDMA TDD is used, the radio base station 20 can calculate the distance R on the basis of the delay of the up data signal received from the radio terminal 10.

(3) Handover Monitoring Based on Error Rate

As a method for determining the threshold TH, at least one of error rates of the up signal or the down signal can be used. Specifically, the error rate acquirer 212 in the radio base station 20 acquires error rates for the radio terminals 10, 11, and predicts the occurrence of handover on the basis of the error rate. Incidentally, as for the error rate for the down signal, the radio terminal 10 transmits the error rate for the down signal to the radio base station 20 by using an up signal, and the, error rate acquirer 212 receives the error rate for the down signal, and thereby predicts handover.

In the radio base station 20, information about the error rate of the up signal acquired by the error rate acquirer 212 and the error rate of the down signal transmitted by the radio terminal 10 are sent to the process number controller 204. The process number controller 204 performs collation by using the table collator 207 and the threshold table, and determines a threshold TH associated with an index value of error rate.

(4) Handover Monitoring Based on Handover Request

As the method for determining the threshold TH, it is also possible to reduce the threshold TH in the case where it is judged that the radio terminal 10 or the radio network controller 30 conducts handover of the radio terminal 10 from the radio base station 20 to another radio base station.

Specifically, the handover request acquirer 210 receives a handover request transmitted from the radio terminal 10, 11 or the radio network controller 30, thereby detects the occurrence of handover, determines the threshold TH, and then conducts the processing of the step S103 and the subsequent steps.

(Variant)

The present invention is not restricted to the embodiment, but the following alterations may be effected.

For example, in the embodiment, the radio quality acquirer, the error rate acquirer and the position information calculator provided in the radio base station 20 may be provided in the radio terminals 10 and 11.

Figure 6:
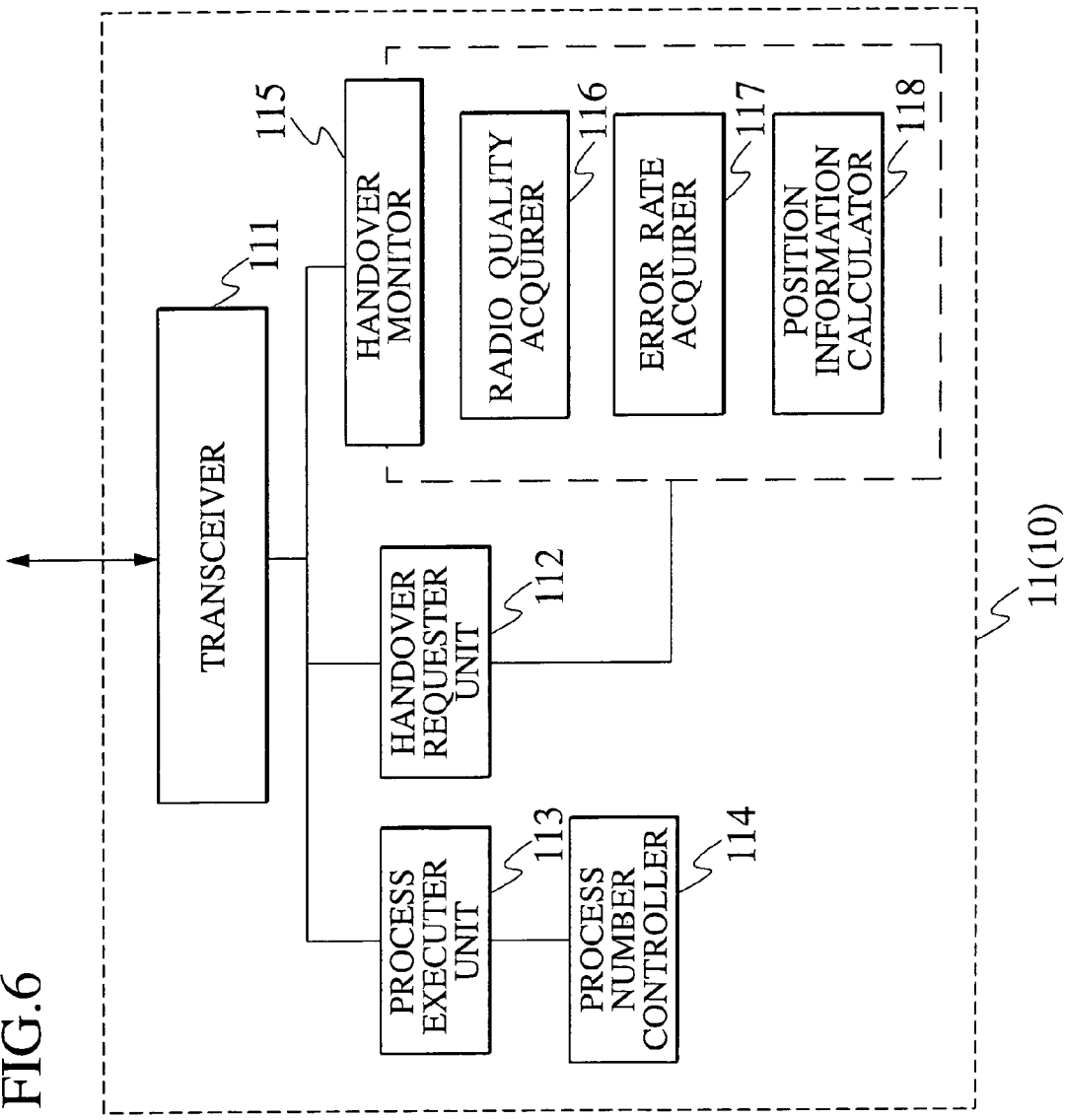
FIG. 6 is a block diagram showing an internal configuration of a radio terminal according to a variant of the present invention.

Specifically, as shown in FIG. 6, a handover monitor 115 and a handover requester 112 are provided in the radio terminals 10 and 11. If the handover monitor 115 has detected the occurrence of handover or a possibility of occurrence of handover, the handover monitor 115 transmits a handover request to the radio network controller 30 via the handover requester 112 and a transceiver 111. The radio network controller 30 can transfer the handover request to the handover request acquirer 210 in the radio base station 20, and order the handover request acquirer 210 to reduce the threshold TH.

In this case, it is desirable to provide a process number controller 114 connected to a process executer 113 so as to cope with the number of processes determined by the radio base station 20.

Figure 7:
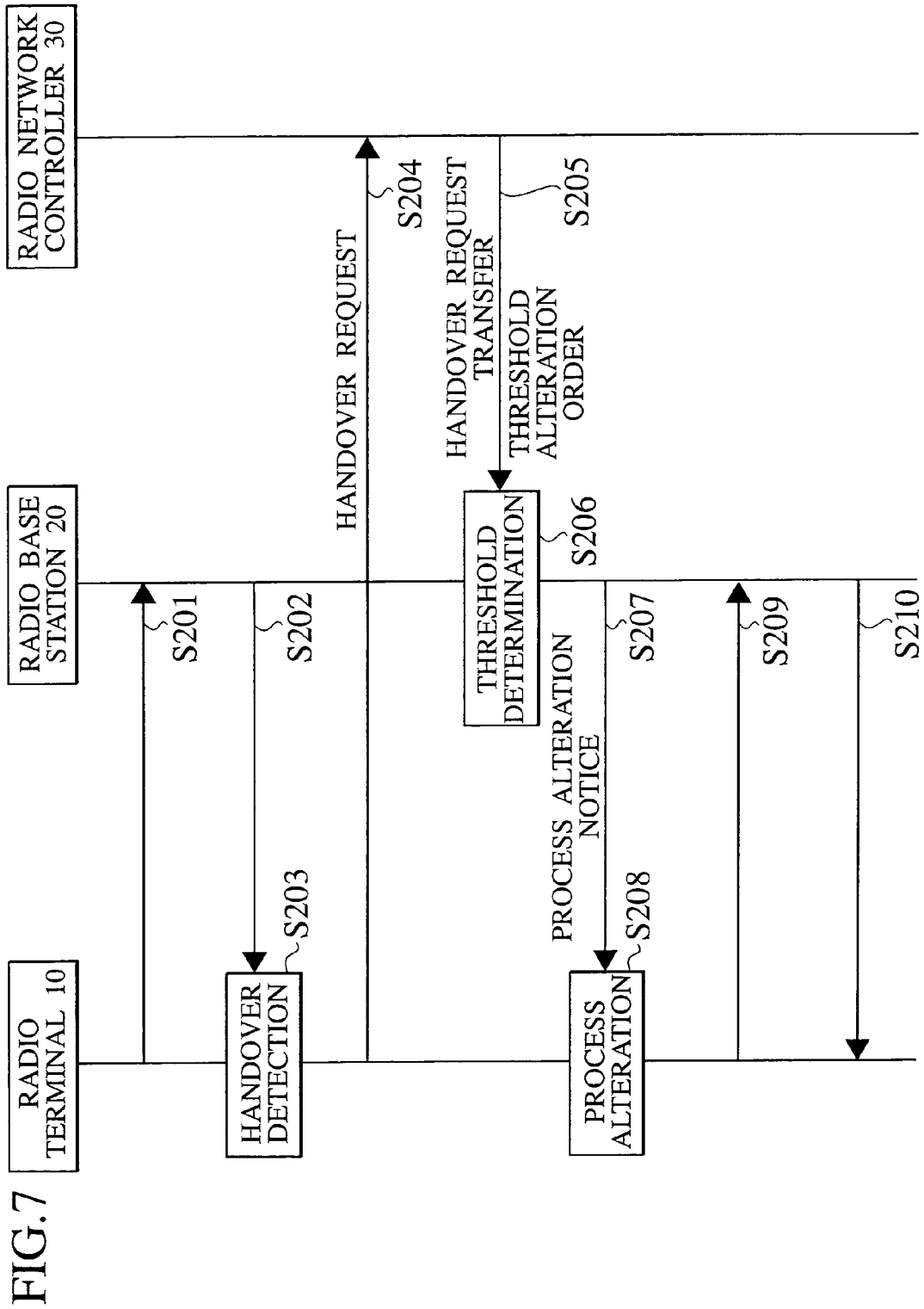
FIG. 7 is a sequence diagram showing a procedure of a radio communication method according to a variant of the present invention.

A radio communication method using the radio communication system according to present variant is conducted according to the following procedure. FIG. 7 is a sequence diagram showing a procedure of the radio communication method according to present variant.

First, in ordinary communication (S201 and S202), the handover monitor 115 monitors a down communication signal, and thereby detects radio quality degradation or an error rate increase in the communication to the radio base station 20, or an increase in distance from the radio base station 20, by using a radio quality acquirer 116, an error rate acquirer 117 and a position information calculator 118.

Upon detecting the occurrence of handover or its possibility on the basis of degradation in radio quality in down communication (S203), the handover requester 112 transmits a handover request to the radio network controller 30 via the transceiver 111 (S204).

Upon receiving the handover request from the radio terminal 10, the radio network controller 30 transfers the handover request to the radio base station 20, and orders the radio base station 20 to reduce the threshold TH (S205). Upon receiving the order, the radio base station 20 executes the steps S101 to S110 described above, and thereby determines the number of processes for the radio terminal 10 (S206).

Thereafter, in the radio terminal 10, the process number controller 114 acquires the number of processes determined by the radio base station 20 (S207), and the process number controller 114 alters (reduces) the number of processes executed in the process executer 113 (S208). The radio terminal 10 conducts communication with the radio base station 20 with the altered number of processes (S209 and S210).

According to the radio communication system and the radio communication method according to the present embodiment, the radio terminal also monitors radio quality, error rate and the distance from the radio base station, and detects handover occurrence. As a result, a more practical adjustment on the number of processes becomes possible.

As heretofore described, according to the radio communication system, radio communication method, radio base station and radio terminal according to the present invention, the radio base station determines whether there is a possibility of handover in down data transmission according to IMT-2000 HSDPA by using radio quality, error rate and the distance between the radio base station and the radio terminal. If there is a possibility of handover, the radio base station limits the number of processes for conducting the retransmission and reduces the retransmission data. As a result, it is possible to prevent the throughput of the whole system from being lowered by discarding retransmission data at the time of handover.

It should be appreciated by those skilled in the art that although the present invention has been described with reference to embodiments, the present invention is not limited to the described embodiments. The present invention can be implemented in modified and altered modes without departing from the spirit and scope of the present invention defined by the appended claims. Therefore, description herein has been made for the purpose of illustration, and it does not limit the present invention in any sense.

What is claimed is:

1. A radio communication method of conducting data transmission and reception in a system with a automatic repeat request (ARQ/HARQ) between a radio base station and a radio terminal by executing one or more processes for automatic repeat request, (ARQ/HARQ) the radio communication method comprising the steps of:
   executing the automatic repeat request (ARQ/HARQ) processes in the radio base station and in the radio terminal, and transmitting/receiving data to/from the radio terminal;
   monitoring in the radio base station for the occurrence of handover or for a possibility of occurrence of handover in the radio terminal; and
   limiting a number of said automatic repeat request (ARQ/HARQ) processes executed at the executing step according to a result of monitoring conducted at the monitoring step.

2. A radio base station in a system with automatic repeat request (ARQ/HARQ) for conducting data transmission and reception with a radio terminal, the radio base station comprising:
   a process executer for executing processes for automatic repeat request (ARQ/HARQ) based on processes for automatic repeat request (ARQ/HARQ) executed in the radio terminal, and transmitting/receiving data to/from the radio terminal;

a handover monitor for monitoring for the occurrence of handover or for a possibility of occurrence of handover in the radio terminal; and a process number controller for limiting a number of said automatic repeat request (ARQ/HARQ) processes executed by the process executer according to a result of monitoring conducted by the handover monitor.

3. The radio base station according to claim 2, wherein the handover monitor is configured to detect a possibility of occurrence of handover on the basis of an error rate in radio communication between the radio base station and the radio terminal.

4. The radio base station according to claim 2, wherein the handover monitor is configured to detect a possibility of occurrence of handover on the basis of a distance between the radio base station and the radio terminal.

5. The radio base station according to claim to 2, wherein the process number controller comprises a threshold table in which an index value indicating the occurrence of handover or a possibility of its occurrence is associated with a threshold in the number of processes that can be executed, and the process number is configured to collate a result of monitoring conducted by the handover monitor with the threshold table, and to limit the number of processes that can be executed, on the basis of a result of the collation.

6. The radio base station according to claim 2, wherein the process executer comprises a retransmission process detector for detecting a process that is conducting data retransmission, and the process executer is configured to conduct, if a process that is conducting data retransmission is detected, data transmission and reception by preferentially using the process that is conducting the data retransmission.

7. A radio terminal for conducting data transmission and reception with a radio base station by executing one or more automatic repeat request (ARQ/HARQ) processes, the radio terminal comprising:

a handover monitor for monitoring for the occurrence of handover or for a possibility of occurrence of handover in the radio terminal;

a handover requester for transmitting handover requesting information to the radio base station according to a result of the monitoring conducted by the handover monitor;

a process executer for conducting data transmission and reception by using the number of automatic repeat request (ARQ/HARQ) processes that can be executed and determined by the radio base station; and a process number controller for limiting a number of said automatic repeat request (ARQ/HARQ) processes executed in the process executer based on a threshold obtained from the radio base station.

8. The radio terminal according to claim 7, wherein the handover monitor detects a possibility of occurrence of handover on the basis of an error rate in radio communication between the radio base station and the radio terminal.

9. The radio terminal according to claim 7, wherein the handover monitor detects a possibility of occurrence of handover on the basis of a distance between the radio base station and the radio terminal.

* * * * *